(12) United States Patent
Hince

(10) Patent No.: US 6,749,660 B2
(45) Date of Patent: Jun. 15, 2004

(54) SOLID-CHEMICAL COMPOSITION AND METHOD OF PREPARATION FOR THE ANAEROBIC BIOREMEDIATION OF ENVIRONMENTAL CONTAMINANTS COUPLED TO DENITRIFICATION

(75) Inventor: Eric Christian Hince, Campbell Hall, NY (US)

(73) Assignee: Geovation Technologies, Inc., Florida, NY (US)

( * ) Notice: Subject to any disclaimer, the term of this patent is extended or adjusted under 35 U.S.C. 154(b) by 229 days.

(21) Appl. No.: 09/873,576

(22) Filed: Jun. 4, 2001

(65) Prior Publication Data

US 2002/0178772 A1 Dec. 5, 2002

(51) Int. Cl.7 .................................................. C05G 1/00
(52) U.S. Cl. ...................... 71/31; 71/33; 71/54; 71/56; 71/57; 71/58; 71/28; 71/29; 71/30; 71/61; 71/64.03
(58) Field of Search ............................... 71/31, 33, 28, 71/29, 30, 54, 56, 57, 58, 64.03, 61

(56) References Cited

U.S. PATENT DOCUMENTS

| | | | |
|---|---|---|---|
| 2,729,554 A | | 1/1956 | Nielsson |
| 2,741,545 A | | 4/1956 | Nielsson |
| 3,839,007 A | * | 10/1974 | Pendergrast .................... 71/41 |
| 3,912,802 A | * | 10/1975 | McCullough et al. ........ 423/306 |
| 4,045,204 A | | 8/1977 | Matsunaga et al. |
| 4,055,974 A | * | 11/1977 | Jackson, Jr. .................... 71/11 |
| 4,134,750 A | | 1/1979 | Norton et al. |
| 4,321,078 A | | 3/1982 | Michaud |
| 4,385,920 A | * | 5/1983 | Dancy et al. ................... 71/36 |
| 4,500,336 A | | 2/1985 | Van Hijfte et al. |
| 4,560,400 A | | 12/1985 | Allan et al. |
| 4,568,559 A | | 2/1986 | Nuwayser et al. |
| 4,579,579 A | | 4/1986 | Kerr |
| 4,589,904 A | | 5/1986 | Harrison et al. |
| 4,743,289 A | | 5/1988 | Mickus et al. |
| 4,851,027 A | | 7/1989 | Murayama et al. |
| 4,954,134 A | | 9/1990 | Harrison et al. |
| 4,968,499 A | * | 11/1990 | Barber ........................ 423/322 |
| 5,089,041 A | | 2/1992 | Thompson et al. |
| 5,219,465 A | | 6/1993 | Goertz et al. |
| 5,264,018 A | | 11/1993 | Koenigsberg et al. |
| 5,435,821 A | | 7/1995 | Duvdevani et al. |
| 5,803,946 A | | 9/1998 | Petcavich et al. |
| 6,120,574 A | | 9/2000 | Moore |

\* cited by examiner

Primary Examiner—C. Sayala

(57) ABSTRACT

This invention concerns the formulation and preparation of ammonium- and urea-free solid-chemical compositions for the anaerobic bioremediation of environmental contamination using the biological process of denitrification. The composition includes nitrate salts and may also include additional sources of nutrient phosphorus, potassium and trace elements. The use of complex phosphates (i.e., salts of phosphoric acid) is used as a combined binder-nutrient system. The use of complex phosphates in this manner enables the water-based agglomeration of the composition into granular forms in a manner which greatly improves upon the safety of the commonly known "Tennessee Valley Authority" type granulation processes by reducing or eliminating the use of the highly toxic and dangerous chemicals anhydrous ammonia, sulfuric acid, and phosphoric acid.

10 Claims, No Drawings

US 6,749,660 B2

SOLID-CHEMICAL COMPOSITION AND METHOD OF PREPARATION FOR THE ANAEROBIC BIOREMEDIATION OF ENVIRONMENTAL CONTAMINANTS COUPLED TO DENITRIFICATION

BACKGROUND—FIELD OF THE INVENTION

This invention discloses advanced means for the formulation and preparation of solid-chemical compositions which provide for the slow, sustained-release of water-soluble nutrients, electron acceptors and other agents for agriculture and waste-treatment, in particular, the bioremediation of contaminated environmental media. Specifically, the present invention was developed to provide formulations of solid-chemical compositions and means for their preparation which provide improved means of providing the sustained-release of water-soluble nutrients to plants for agricultural/ agribusiness and horticultural applications and to both plants and other biological organisms, such as bacteria and fungi, for the biologically mediated treatment of organic wastes and contaminated environmental media. An important advantage of the present invention is that the disclosed chemical formulations and the disclosed means for their manufacture are relatively simple and less expensive to produce than existing slow release of nutrient compositions. Moreover, the present invention can enable the production of slow-release solid-chemical fertilizers and nutrient formulations utilizing existing and underutilized manufacturing facilities in the U.S. and abroad.

Soil and ground-water pollution caused by chemical contaminants and excess nutrients released into the environment are well documented, world-wide problems. Such contamination is associated with many different types of agricultural and industrial activities over the last two centuries.

Nutrient contamination associated with agricultural activities is attributable to the relatively high solubilities of the nutrients present in most commercial fertilizer products. The high concentration and high-solubility of these fertilizers act to establish very high concentration gradients which tend to drive the rapid run-off and dispersion of the constituent nutrient compounds into the environment. Consequently, there is often insufficient time for the "target" plants or other biological organisms to efficiently, let alone completely, utilize the nutrient substances contained in these commercial fertilizers. Hence, much of the fertilizer may bypass the agricultural "target" and enter surface-water bodies via run-off or pollute ground-water aquifers via infiltration.

Despite recent advances in the art of slow-release fertilizers, the high costs of these materials has generally limited their utility to the home-and-garden horticulture market. Currently, there remains a need for more economical slow-release fertilizers which can be used to address the needs and environmental impacts associated with large-scale agricultural and horticultural fertilizer applications. The present invention discloses slow-release solid-chemical nutrient compositions and methods for their preparation and use which provide improved and significantly more economical means of meeting the needs of such large-scale agricultural and horticultural practices. Examples of agricultural applications and advantages of the present invention include enhanced efficiency of uptake of nutrients by plants and biological organisms, and reduced environmental contamination from nutrient run-off to surface-waters and ground-water aquifers.

Common chemical contaminants in the environment include many different types and forms of petroleum hydrocarbons, halogenated organic compounds including solvents (e.g., tetra- and trichloroethene, methylene chloride), organochlorine pesticides (e.g., DDT and toxaphene), and polychlorinated biphenyls (i.e., PCBs). The available toxicological data indicates that many of these contaminants, in particular many organic solvents and halogenated organic compounds, are toxic, carcinogenic or potentially carcinogenic to humans, animals and other environmental receptors. In addition, the available environmental and ecological data have shown that many of these contaminants tend to persist in the environment for long time periods. The long-term stability and extremely slow degradation of many such environmental contaminants presents a substantial, long-term hazard to human health and the environment throughout the industrialized world.

Many of the so-called conventional methods for the remediation or clean-up of chemically contaminated wastes, waters, soils, and sediments have generally involved either the physical removal of the contaminated media or the simple mass transfer of the contaminants from one media (e.g., soil) to another (e.g., air). In general, such physical-treatment technologies do not involve the chemical and/or biological destruction, breakdown, transformation, or detoxification of the contaminants. Two of the most common categories of physical environmental-remediation technologies are the excavation and off-site disposal (or treatment) of contaminated soils and the pumping and subsequent treatment of contaminated ground water.

Recently, there have been significant advancements in the use of biological-treatment processes to treat environmental contamination. A promising category of environmental remediation technologies, phytoremediation, utilizes various types of plants to degrade, transform or extract contaminants. Phytoremediation is growing rapidly in terms of its use and acceptance for treating contaminants in soils, sediments and shallow water bodies, including shallow ground-water aquifers. Another growing field of environmental-remediation technologies, bioremediation, involves the use of various methods and processes to stimulate the activity of microorganisms and fungi to convert chemical compounds into innocuous or less harmful chemical compounds. Phytoremediation and bioremediation technologies generally have lower costs associated with their use and implementation than do the competing physical technologies. Phytoremediation and bioremediation technologies can also be adapted to a broader range of contamination problems and variations in field conditions than other types of remediation technologies.

The most promising phytoremediation and bioremediation technologies provide the additional capability of treating contaminated media in-situ, i.e., in place, without the need for ground-water pumping or soil excavation. For example, there are numerous recent examples of bioremediation methods which have demonstrated the technical feasibility and commercial viability of various means of promoting beneficial remediation processes mediated by indigenous or "native" contaminant-degrading bacteria, fungi and other microorganisms which are naturally present in the contaminated media. The presence of naturally occurring, contaminant-degrading microorganisms in many different types of environmental media has been extensively documented in the scientific literature, and the ability to stimulate beneficial remediation processes mediated by such naturally occurring organisms has helped create growing acceptance of bioremediation methods by regulators and growing demand in the environmental-remediation marketplace.

Despite recent advances in the art of phytoremediation and bioremediation, there remains a need for improved, cost-effective nutrient compositions and application methods which can provide practical and economical means of driving successful phytoremediation and bioremediation programs at contaminated sites throughout the world. The present invention discloses slow-release solid-chemical nutrient compositions and methods for their preparation and use which provide improved means for the prolonged stimulation of biological remediation processes. Hence, the present invention can provide improved means of enhancing the bioremediation and phytoremediation of wastes, soils, sediments, surface-waters, ground-waters and the like caused by releases of petroleum hydrocarbons, organic solvents, MTBE, pesticides, PCBs and other environmental contaminants.

BACKGROUND—DESCRIPTION OF PRIOR ART

With respect to agricultural practices and problems, the discharge of excess nutrients to surface waters, ground-waters and other environmental receptors is a documented problem both in the U.S. and overseas. For example, the infiltration of excess or "unused" inorganic fertilizers has led to the contamination of ground-water aquifers with nitrates and other nutrients. Also, surface run-off of excess or "unused" inorganic fertilizers from farms can lead to algal blooms in surface-water streams, rivers, lakes and estuaries, where such nutrients can lead to "eutrophication," i.e., the depletion of dissolved oxygen, which can lead to devastating environmental impacts. These problems are exacerbated by the nature of the common solid-and liquid-chemical fertilizers used in agriculture, which typically include large amounts of highly soluble nutrients which can migrate to surface-waters, ground-waters and other environmental receptors faster than they can be utilized by agricultural plants and beneficial microorganisms.

Given the growing problems associated with the use of highly soluble and mobile fertilizers, a growing number of "slow release" fertilizers have been developed as described in the prior art. Most of the slow-release fertilizers which have been disclosed in the prior art and/or which are commercially available are based on the use of low-solubility organic-polymer systems and coatings to impede the release of water-soluble nutrients, such as species of nitrogen, phosphorus and potassium. The primary disadvantage of these organopolymer-based slow-release fertilizers is their high cost, which has generally limited their utility to the home and garden market. Currently, no low-cost slow-release fertilizers are commercially available which can be produced and distributed using cost-effective materials and methods which enable the advantages of slow-release fertilizers to be utilized economically in large-scale agricultural and horticultural activities. By contrast, the present invention provides an improved slow-release technology which can be produced economically such that it may serve not only the home and garden "horticulture" market, but also the larger and more environmentally sensitive agricultural and horticultural markets (e.g., the golf-course maintenance industry).

U.S. Pat. No. 6,120,574 (Sep. 19, 2000) to William Moore (LESCO, Inc.) discloses a slow-release "fertilizer spike." The patent to Moore describes an "attrition-resistant" fertilizer spike composition wherein the fertilizer spike has sufficient mechanical strength to be "hammered" into the ground. The fertilizer composition includes a combination of a phosphate ion combined with both a monovalent and divalent cation, and utilizes a coating of a "thermoplastic adhesive with a softening temperature of between 65 and 160° C."

U.S. Pat. No. 5,803,946 (Sep. 9, 1998) to Petcavich and Yang (Planet Polymer Technologies, Inc.) discloses a controlled-release plant nutrient which utilizes plant nutrient particles comprising urea which are coated by a water-insoluble, biodegradable "polymer network" comprised of a biuret, a urethane and a tung oil. Petcavich and Yang also disclose a method of making the aforementioned controlled release plant nutrient.

U.S. Pat. No. 5,435,821 (Jul. 25, 1995) to Duvdevani et al. (Exxon Research & Engineering Co.) discloses controlled release vegetation enhancement agents which are coated with sulfonated polymers. Duvdevani et al. more specifically describe their invention as a "vegetation enhancement composite [material]" which consists of a primary fertilizer, an inhibitor of nitrification activity, a slow-release fertilizer and mixtures thereof with a pesticide which are at least partially coated with a sulfonated polymer coating. Duvdevani et al. also disclose means of producing and using the aforementioned vegetation-enhancement agents.

U.S. Pat. No. 5,089,041 (Feb. 18, 1992) to Thompson and Kelch (O.M. Scotts & Sons Company) discloses an encapsulated slow-release fertilizer comprising water soluble core materials with a water-insoluble polymeric coating. Thompson and Kelch further describe the polymer coating used to encapsulate the water-soluble materials as a water-borne polyvinylidene chloride-based latex composition. The coating provides for the release of the water-soluble core material over time.

U.S. Pat. No. 5,219,465 (Jun. 15, 1993) to Goertz et al. (O.M. Scotts & Sons Company) discloses sulfur-coated fertilizers which have "polymeric topcoats" which provide for release of the fertilizer according to an essentially linear, diffusion-controlled rate. Goertz et al. also disclose means for the preparation of their disclosed fertilizer.

U.S. Pat. No. 4,851,027 (July 25, 1989) to Murayama et al. (Kyowa Hakko Kogyo, Co., Ltd., Tokyo, Japan) discloses a "gradually effective" coated fertilizer. Murayama et al. disclose an invention whereby a solid fertilizer is coated with a material comprising an aqueous emulsion of resin which forms a resin film on the surface of the solid fertilizer.

U.S. Pat. No. 4,568,559 (Feb. 4, 1986) to Nuwayser and Nucefora (Biotek, Inc.) discloses a process for preparing coated microparticles. The process involves a solvent solution of an active ingredient which is to be encapsulated with a film-forming polymer upon the removal of the solvent. A fluidized-bed process for the preparation of the composite-core coated microparticles is described by Nuwayser and Nucefora.

U.S. Pat. No. 4,579,579 (Apr. 1, 1986) to Thomas Kerr (Nitrogen Plus, Inc.) discloses a method for preparing a slow-release fertilizer comprising the treatment of ground peanut hulls with nitric acid and sodium hydroxide followed by the addition of other fertilizer nutrients such as potash, superphosphates and ammonium nitrate.

U.S. Pat. No. 4,560,400 (Dec. 24, 1985) to Allan et al. (Melamine Chemicals, Inc.) discloses a granular fertilizer product and means of producing and using the same. The fertilizer granules disclosed by Allan et al. combines a poorly soluble nitrogen source with a U.S. Pat. No. 4,500,336 (Feb. 19, 1985) to Van Hijfte and Vanmarcke (Compagnie Neerlandaise de l'Azote, Belgium), discloses a process for making fertilizer granules containing urea as the main ingredient. The fertilizer process disclosed by Van Hijfte and Vanmarcke involves sequential steps starting with prilling or granulating a urea melt or an aqueous solution of urea to which additional fertilizer compounds and an aluminum salt is added.

U.S. Pat. No. 4,321,078 (Mar. 23, 1982) to Michael Michaud discloses a slow-release fertilizer composition. The solubility and concentration of each of the nutrients is determined by the addition and mixture of fertilizer components which upon entering solution co-act to control, at an optimum concentration, each of the plant nutrients. The disclosed slow-release fertilizer composition comprises the nutrients nitrogen, phosphorous, calcium, sulfur, magnesium, and potassium as well as iron, manganese, zinc, copper and boron. The primary nutrients of the disclosed composition, by weight, are hydrated ammonium-calcium phosphate (from 20–80%), calcium-hydrogen phosphate (from 0 to 60%), calcium-magnesium carbonate (from 7–16%), potassium silicate (from 5–30%) and calcium sulfate (up to 25%). Means for preparation of the slow-release nutrient composition are disclosed which involve the preparation of concentrated solutions of the constituent ingredients which are heated and dried in a sequential, multi-step process.

U.S. Pat. No. 4,055,974 (Nov. 1, 1977) to Laban Jackson (International Spike, Inc.) discloses a "disintegratable fertilizer tablet" which is adapted to absorb water and disintegrate, thereby releasing a fertilizer. The disclosed invention comprises fertilizer source materials and particles of a "water insoluble, water swellable, hydrophilic polymeric gel" which are compressed into a dense tablet using a binder such as urea formaldehyde.

U.S. Pat. No. 4,045,204 (Aug. 30, 1977) to Matsunaga et al. (Kyowa Hakko Kogyo, Co., Ltd., Tokyo, Japan) discloses a fertilizer composition manufactured by mixing a fertilizer or a fertilizing substance with a pullulan, or a derivative thereof, which serves as a binder and solidifier.

U.S. Pat. No. 3,839,007 (Oct. 1, 1974) to Robert Pendergast (United States Steel Corporation), discloses a slow-release fertilizer comprising phosphate particles. The method disclosed by Pendergast involves the preparation of rock phosphate granules in the size range of −4 to +28 mesh with phosphoric acid.

While there is an extensive body of prior-art literature and patents concerning various means of using phytoremediation and bioremediation processes, the present invention provides unique advantages and benefits which may be used to facilitate or augment a number of different types of biological treatment processes. Moreover, the present invention addresses the current shortage of commercially available, cost-effective slow-release nutrient compositions for the phytoremediation and bioremediation of environmental contaminants.

U.S. Pat. No. 5,264,018 to Koenigsberg et al. discloses a method for decontaminating soil by applying an oxygen delivery vehicle (i.e., oxygen release compounds; "ORC") such as peroxides of calcium, potassium, or magnesium or mixtures thereof in an amount which increases the population of microorganisms in the soil that promote the biological degradation of environmental pollutants. The rate of liberation of oxygen from the ORC is controlled by adding a source of a simple phosphate (e.g., dihydrogen phosphate alkali metal salts, hydrogen phosphate alkali metal salts, urea phosphate, monoammonium phosphate, diammonium phosphate) into the aqueous phase during preparation of the metal peroxide to achieve the "intercalation" of the simple phosphates with the metal peroxides. The composition may additionally comprise a surfactant, macronutrients, micronutrients, or other beneficial additives for supplementing the nutrition and environment of the pollutant degrading microorganisms.

The pending U.S. patent application of Eric Hince (Geovation Technologies, Inc.; Ser. No. 09/722,878), discloses an improved solid-chemical composition which provides for the slow release of active oxygen for bioremediation and waste treatment. Hince discloses compositions which combine solid-chemical sources of active oxygen, such as calcium and magnesium peroxides, with complex inorganic phosphates, including salts of phosphoric acid, which are prepared in the preferred forms of granules, briquettes and the like. The preferred means of producing the compositions disclosed by Hince is according to a compaction-type briquetting and granulation process. Oxygen release is facilitated by the complex phosphates as well as the interstitial porosity of the granules which allow the oxygen "stored" in the solid-chemical peroxides to be released into the aqueous phase.

As indicated above, while there is some limited prior art concerning the use of slow-release compositions in bioremediation applications, no means have previously been provided for preparing cost-effective slow-release bioremediation nutrient compositions nor has an improved, water-based high-shear granulation process been disclosed for the preparation of such compositions. The present invention helps overcome the current limitations in the prior art concerning slow-release bioremediation nutrient compositions. The present invention also provides a practical and economical means of preparing the disclosed compositions according to the disclosed, water-based high-shear granulation process.

According to fertilizer industry executives, the bulk of the granular solid-chemical fertilizers produced for large-scale agricultural markets is produced using the high-shear granulation process developed by the Tennessee Valley Authority (TVA). The typical TVA-type high-shear granulation process involves the production of granular fertilizer blends via the mixing, heating and drying of various blends of prilled or powdered fertilizer chemicals, such as various phosphate compounds and salts of nitrate, ammonium and urea, in combination with application of anhydrous ammonia and concentrated sulfuric and phosphoric acids. The sulfuric and phosphoric acids are used to create a "slurry" of the blended fertilizer components in a rotating tumbler "bin." The slurry blend is dried in the rotating bin via a combination of the heat produced from the exothermic reactions caused by the anhydrous ammonia and the concentrated sulfuric and phosphoric acids. Heated air is also forced through the rotating tumbler/bin to help dry the granulated fertilizer blends.

The "conventional" Tennessee Valley Authority (TVA) ammoniator-granulator high-shear granulation fertilizer production process is described in U.S. Pat. Nos. 2,729,554 (Jan. 3, 1956) and 2,741,545 (Apr. 10, 1956). U.S. Pat. No. 2,729,554 describes a process for "continuously ammoniating superphosphate" involving the use of liquid or gaseous ammonia and a solid nitrogen carrier, such as ammonium nitrate or urea, as "ammoniating" agents to treat superphosphate. U.S. Pat. No. 2,741,545 describes a pug-mill type of ammoniator/granulator for continuous operation of the process described in U.S. Pat. No. 2,729,554.

U.S. Pat. No. 4,134,750 (Jan. 16, 1979) to Norton and Parker (Tennessee Valley Authority, Muscle Shoals AL) describes the production of granular ammonium phosphate sulfate and urea-ammonium phosphate sulfate. Norton and Parker disclose an improved TVA-type high-shear granulation process which involves the use of phosphoric and sulfuric acids, anhydrous ammonia and urea in a manner that eliminates the use of the conventional dryer system.

U.S. Pat. No. 4,954,134 (Sep. 4, 1990) to Harrison and Tittle (Tennessee Valley Authority, Muscle Shoals Ala.) describes fertilizer formulations and means for their agglomeration involving gypsum, limestone or a mixture thereof. Harrison and Tittle disclose a means for preparing a source of calcium as a secondary nutrient comprising a low-solubility source of calcium, namely a mixture of limestone and gypsum, which is agglomerated using a lignosulfate binder solution as a "granulation/dispersion" additive.

U.S. Pat. No. 4,743,289 (May 10, 1988) to Mickus et al. (Tennessee Valley Authority, Muscle Shoals Ala.) disclose the use of lignosulfate as a granulation aid and particle hardener in a granulation process involving the use of sulfuric acid and ammonia. Mickus et al describe the granulation of "by-product ammonium sulfate crystals" according to their disclosed method.

U.S. Pat. No. 4,589,904 (May 20, 1986) to Harrison and Tittle (Tennessee Valley Authority, Muscle Shoals Ala.) describe a means for the granulation of "by-product ammonium sulfate" using a "conventional drum ammoniator granulator" using a sulfuric acid-alum solution and anhydrous ammonia as granulation agents. The granular product is required to be dried by the counter-current flow of hot gases as opposed to the more conventional method of co-current gas flow.

While there is an extensive body of prior art concerning the TVA-type high-shear granulation process and modifications thereof, no means are currently available to provide a simpler and safer high-shear granulation process which eliminates or minimizes the use of the hazardous chemicals anhydrous ammonia and concentrated sulfuric and phosphoric acids and replaces the same with water, let alone a formulations and means for preparing cost-effective slow-release nutrient and fertilizer compositions using an improved high-shear granulation process. The present invention provides specific means of formulating and preparing granular solid-chemical fertilizer and nutrient compositions, including slow-release compositions, using an improved, water-based high-shear granulation process.

SUMMARY OF THE INVENTION

This invention discloses advanced means for the formulation and preparation of solid-chemical compositions which provide for the slow, sustained-release of water-soluble nutrients, electron acceptors and other agents for agriculture and waste-treatment, in particular, the bioremediation of contaminated environmental media. Specifically, the present invention was developed to provide formulations of solid-chemical compositions and means for their preparation which provide improved means of providing the sustained-release of water-soluble nutrients to plants for agricultural/agribusiness and horticultural applications and to both plants and other biological organisms, such as bacteria and fungi, for the biologically mediated treatment of organic wastes and contaminated environmental media. The disclosed formulations and means of production of the slow-release solid-chemical compositions of the present invention utilize a novel and economical "biphasic" chemical-system technology which involves a combination of a first "nutrient" component (1) which comprises water-soluble nutrients and other biologically utilizable substances with a second component (2) which comprises an inorganic geochemical-binder system. The simplest embodiment of the geochemical-binder system comprises one or more salts of phosphoric acid. In the preferred embodiments of the present invention intended for the slow-release of the ingredients contained in the "nutrient" component (1), the geochemical-binder system of component (2) comprises a combination of one or more salts of phosphoric acid with a matrix containing low-solubility carbonates and low-solubility phosphates. Particular advantages of the disclosed geochemical-binder system of component (2) is that it allows for a wide variation in the formulation of the first "nutrient" component (1) to be prepared in both quick-(i.e., conventional) and slow-release forms using an improved high-shear granulation process. The present invention discloses means by which such compositions can be economically prepared in large quantities so as to meet the specific needs of different sectors of the agricultural/agribusiness and phytoremediation/bioremediation markets.

The disclosed solid-chemical compositions of the present invention provide improved, cost-effective means for slowing and controlling the release-rate profiles of water-soluble nutrients, such as nitrogen- and phosphorus-rich compounds, and improved means for enhanced and/or time-targeted nutrient uptake by plants and microorganisms. The present invention also provides improved means for the reduction of nutrient run-off from agricultural areas into surface waters and means of preventing or minimizing nutrient-contamination of ground-water aquifers.

The disclosed solid-chemical compositions also provide improved means for the phytoremediation and bioremediation of environmental contamination and wastes by providing a slow, sustained release of nutrients, electron acceptors and other beneficial agents for sufficiently long periods of time to enable the biologically mediated degradation, transformation, and/or detoxification reactions to proceed to the extent that the concentrations and/or toxicity of the contaminants are reduced to acceptable levels. The present invention also provides for significant cost savings relative to other means and methods for environmental remediation. With respect to environmental remediation applications, the present invention can reduce the operation and maintenance (O&M) costs associated with environmental remediation programs, and it can reduce, if not eliminate, the need for excavation, pumpage, transportation, and/or off-site treatment of contaminated environmental media such as wastes, soil, or water.

An important advantage of the present invention is that the disclosed solid-chemical compositions and means for their manufacture are relatively simple and inexpensive relative to the currently available slow-release fertilizers and nutrient compositions. Moreover, the present invention can provide for the economical large-scale production of the disclosed slow-release solid-chemical fertilizers and nutrient formulations via the use of existing manufacturing facilities in the U.S. and abroad for which there is presently a significant, underutilized manufacturing capacity. For example, the preferred means of producing the disclosed solid-chemical compositions of the present invention is via the disclosed simpler and safer variant of the Tennessee Valley Authority (TVA) high-shear granulation process which can eliminate or significantly reduce the use of dangerous chemicals such as anhydrous ammonia and concentrated sulfuric and phosphoric acids. Currently the TVA-type high-shear granulation capacity in the U.S. alone is reported by industry executives to be less than 40% utilized by the fertilizer industry. Accordingly, the present invention teaches improved means by which the disclosed solid-chemical compositions can be formulated and produced on a large, economical scale using an improved TVA-type high-shear granulation manufacturing process which can largely utilize existing manufacturing equipment and infrastructure. Consequently, the combined advantages of the present invention should allow for the benefits of slow-release fertilizer technology per se to be provided to end-users for large-scale agricultural, horticulture and environmental remediation applications in a practical and economical manner.

The present invention specifically discloses advanced solid-chemical compositions and improved means for their formulation, preparation and use which provide for the slow, sustained release of water-soluble fertilizers and nutrients for agricultural and bioremediation practices which are more practical and economical than the currently available means described in the prior art. These and other objects and advantages of the present invention will become apparent to those skilled in the art following the detailed description of the invention, and more particularly as defined by the claims.

DETAILED DESCRIPTION OF THE INVENTION

The disclosed formulations of the slow-release solid-chemical compositions of the present invention utilize a novel and economical "biphasic" solid-chemical system comprising:

(i) a first nutrient component (1) which comprises water-soluble forms of nitrogen, phosphorus, potassium and other biologically utilizable nutrient substances; and (ii) a second component (2) comprising a geochemical-binder system. In the simplest preferred embodiment of component (2), the geochemical binder system is comprised of salts of phosphoric acid. In the preferred embodiments of the present invention intended to provide for the slow-release of the constituents in component (1), the slow-release embodiment of the geochemical-binder system of component (2) is comprised of a combination of a matrix of (a) substantially inert, inorganic, low-solubility carbonates and phosphates and (b) salts of phosphoric acid.

The preferred means of producing the slow-release solid-chemical compositions of the present invention is an improved high-shear granulation process. In the simplest and most preferred embodiment of the improved high-shear granulation process disclosed herein, the geochemical-binder system of component (2) and water completely replaces the dangerous liquid and gaseous chemicals typically used in the Tennessee Valley Authority (TVA) type high-shear granulation process, namely anhydrous ammonia and concentrated sulfuric and phosphoric acids, to prepare the biphasic solid-chemical compositions of the present invention. Upon the addition of water to the disclosed compositions according to the improved high-shear granulation process of the present invention, the aforementioned materials in component (2) form a geochemical-binder system which precludes the rapid dissolution of the soluble materials in component (1) so as to provide for the slow, sustained release of these materials.

Alternatively, the chemical formulations and process of the present invention may allow for the use of relatively dilute solutions of phosphoric acid to reduce the material costs of the slow-release chemical compositions of the present invention while still reducing or eliminating the use of anhydrous ammonia and sulfuric acid to provide for a simpler and safer high-shear granulation process. For example, smaller proportions of the salts of phosphoric acid may be used in component (2) of the disclosed compositions in combination with less concentrated solutions of phosphoric acid (relative to the typical TVA process) to produce the disclosed slow-release solid-chemical compositions at a lower material cost in the high-shear granulation process.

For purposes of explanation, and not limitation, the inventor's use of the term "soluble" is meant to imply materials that have a substantially high degree of solubility in cool water, such as the 45° F. to 65° F. temperature range. By contrast, the inventor's use of the term "insoluble" is meant to imply such materials that have a substantial lack of solubility in cool water, such as the 45° F. to 65° F. temperature range.

In the preferred embodiments of the present invention, the water-soluble ingredients comprising "nutrient" component (1) would primarily be comprised of soluble and biologically usable forms of the nutrients nitrogen, phosphorus, and potassium. In addition, for bioremediation/phytoremediation applications, component (1) may also include materials which provide biologically usable electron acceptors such as oxygen, nitrate, iron (III), manganese (IV), sulfate and carbon dioxide.

The sources of biologically usable nutrient nitrogen in component (1) would include one or more selected from the group consisting of granular salts or forms of ammonium, urea, and nitrate. In the preferred embodiments of the present invention, the nitrogen sources included in component (1) would be further selected from the group consisting of ammonium nitrate, sodium nitrate, potassium nitrate, sodium-potassium nitrate, calcium nitrate, ammonium sulfate, ammonium thiosulfate, diammonium phosphate, urea, urea-ammonium nitrate (UAN), isobutyidene diurea (IBDU), sulfur-coated urea and urea formaldehyde.

In the preferred embodiments of the present invention, the sources of biologically usable nutrient phosphorus in component (1) would include one or more selected from the group consisting of diammonium phosphate, mono-ammonium phosphate, disodium phosphate, monosodium phosphate, potassium phosphate, rock phosphate, superphosphate, triple superphosphate, sodium tripolyphosphate, potassium tripolyphosphate, sodium pyrophosphate and potassium pyrophosphate.

In the preferred embodiments of the present invention, the sources of biologically usable nutrient potassium in component (1) would include one or more selected from the group consisting of potassium chloride, potassium-magnesium sulfate, potassium nitrate, sodium-potassium nitrate, potassium sulfate, and potassium phosphate.

For bioremediation applications, ammonium- and urea-free sources of inorganic nitrogen may be preferable for use in component (1) which can provide nitrogen in forms which serve as a nutrient, electron acceptor or both. In the preferred embodiments of the present invention for anaerobic bioremediation applications, the source of inorganic nitrogen would be selected from ammonium-free nitrate salts such as sodium nitrate, sodium-potassium nitrate, potassium nitrate and calcium nitrate. A specific advantage of the use of ammonium-free, inorganic nitrate salts is to provide nitrate nitrogen which can serve as both an electron acceptor for denitrifying microorganisms and as an inorganic form of nutrient nitrogen for other organisms, such as iron-reducing microorganisms, via the process of "dissimilatory" nitrate reduction.

In the simplest preferred embodiment of component (2), the geochemical binder system is comprised of one or more salts of phosphoric acid. In the preferred embodiments of the present invention intended to provide for the slow-release of the constituents in component (1), the slow-release embodiment of the geochemical-binder system would be comprised of (a) low-solubility carbonates, low-solubility phosphates or a combination thereof; and (b) one or more salts of phosphoric acid. In the preferred embodiments of the present invention, the low-solubility carbonates in component (2) would be selected from the group consisting of calcium carbonate, magnesium carbonate, calcium-magnesium carbonate, ferrious carbonate, manganese carbonate, calcite, limestone, dolomite, siderite, rhodochrosite and/or other substantially insoluble carbonates and carbonate minerals which include at least one divalent cation. In the preferred embodiments of the present invention, the low-solubility phosphates would be selected from the group consisting of calcium phosphate, magnesium phosphate, calcium-magnesium phosphate, rock phosphate, apatite-group minerals and other low-solubility phosphates. In the preferred embodiments of the present invention, the salts of phosphoric acid would be selected from the group consisting of sodium hexametaphosphate, sodium trimetaphosphate, potassium hexametaphosphate and potassium tetrametaphosphate.

For purposes of explanation and not limitation, the inventor's use of the term "low solubility" is meant to imply materials with limited solubility in cool water, such as the 45° F. to 65° F. temperature range, as exemplified by calcium carbonate, calcite, aragonite and dolomite of the carbonates; anhydrous calcium phosphate (tricalcium orthophosphate) of the phosphates; and calcium sulfate, anhydrite and gypsum of the sulfates. The solubilities of the aforementioned materials, and the mixtures thereof, is in the range of from a few hundred milligrams per liter to fractions of a gram per liter of water. In the preferred embodiments of the present invention, these carbonates, phosphates and sulfates in component (2) are selected so as to have solubilities which are "low" in comparison to the ingredients in component (1).

Additional inorganic binder materials may be added to the substantially insoluble matrix of geochemical-binder system of component (2). In the preferred embodiments of the present invention, these additional materials would be selected from one or more of the group consisting of lime, sodium bicarbonate, and oxides, hydroxides, oxyhydroxides of metallic ions which can serve as micronutrients for biological processes-e.g., sulfur, calcium, magnesium, boron, copper, iron, manganese, molybdenum and zinc. Based on the knowledge and beliefs of the inventor, these ingredients may enable a wider range of formulations to be manufactured in the preferred high-shear granulation manufacturing process and/or can provide for a wider range of release-rate functions to meet the specific applications of end users of the compositions. In particular, these additional agents can also be used to modify the sustained-release profiles of the "nutrient" ingredients in component (1) by altering the disintegration and dissolution rates of the granular compositions.

In addition to the important water-activated binding activity provided for by the salts of phosphoric acid included in component (2), these compounds are also complex inorganic phosphates which provide sources of nutrient phosphorus in forms which are enzymatically hydrolyzable by microorganisms and which are relatively non-reactive geochemically in the environment. Hence, the inclusion of these salts of phosphoric acid also provides for the more effective and efficient delivery of nutrient phosphorus to plants and microorganisms.

In addition to or in lieu of the metallic-micronutrient oxides, hydroxides and oxyhydroxides described above, a source of micronutrients may also be included in the solid-chemical compositions of the present invention. In the preferred embodiments of the present invention, this source of micronutrients would comprise one or more of the following elements: sulfur, calcium, magnesium, sulfur, boron, copper, iron, manganese, molybdenum and zinc. In the preferred embodiments of the present invention, this source of micronutrients would be comprised of one or more selected from the group consisting of calcium sulfate, calcium chloride, calcitic lime, dolomite, magnesium sulfate, potassium sulfate, potassium-magnesium sulfate, ammonium thiosulfate, ammonium sulfate, borax, boric acid, sodium pentaborate, sodium tetraborate, cupric chloride, copper sulfate, ferrous sulfate, manganese sulfate, ammonium molybdate, sodium molybdate, zinc oxide and zinc sulfate.

In the preferred embodiments of the disclosed geochemical-binder system of component (2) intended for use in slow-release compositions, an important advantage of the disclosed inorganic binder matrix used in the compositions is that the resultant compositions slowly "weather" via natural biogeochemical processes. The inorganic binder matrix is intended to mimic slowly soluble geologic materials, such as carbonate, phosphate and sulfate bearing rocks and sediments. The carbonate-phosphate materials in the embodiments of the disclosed binder matrix tested by the inventor are not insoluble, but rather they are slightly and slowly soluble. Hence, upon exposure to acidic rainfall and acid-producing biogeochemical processes in soils, waters and other environmental media, these minerals slowly weather and dissolve providing for the slow-release of the nutrient ingredients contained in the disclosed solid-chemical compositions. The carbonate and phosphate minerals in the disclosed inorganic binder matrix also provide a gentle type of pH-buffering action to correct and help prevent overly acidic conditions in soil, water and other environmental media.

Additional components which may be included in the disclosed solid-chemical compositions may include chelating agents and disintegrants. The preferred chelating agents would be selected from one or more of the group comprising citric acid, humic acid, fulvic acid, potassium citrate, sodium citrate, nitrilotriacetic acid (NTA), and ethylenediaminetetraacetic acid (EDTA). For agricultural/horticultural and phytoremediation applications, the use of such chelating agents can help chelate important micronutrients, such as calcium, magnesium, boron, copper, iron, manganese, molybdenum and zinc, and improve the uptake of such elements into plants. For bioremediation applications, the inclusion of such chelating agents can be used to help promote anaerobic microbiological processes coupled to the reduction of various metals, such as iron (III), manganese (IV), chromium (VI) and uranium (VI), as well as the use of various metals as micronutrients by microorganisms. In the present invention, the use of citric acid and sodium citrate are the preferred chelating agents, as they are biodegradable and are both effective chelators and pH-modifiers. The use of potassium citrate and humic and fulvic acids in the disclosed solid-chemical compositions of the present invention can provide for similar and complimentary benefits to the use of citric acid and sodium citrate.

Depending on the end user's specific application, another means of modifying the sustained-release profiles of the solid-chemical compositions prepared in accordance with the present invention would be to include a source of disintegrants in the compositions. The disintegrants would preferably be selected from one or more of the group consisting of sodium bicarbonate, sodium bentonite or a combination thereof. The use of such disintegrants would enhance the disintegration of the granular solid-chemical compositions, and in turn, increase the release-rate profiles of the nutrient ingredients of component (1).

An important advantage of the disclosed geochemical-binder system which comprises component (2) is that it provides for significant variation and flexibility in the formulation of the first "nutrient" component (1). Based on the knowledge and beliefs of the inventor, the slow-release functions provided for by component (2) via the high-shear granulation process appear to be independent of the formulation of component (1). As described in the following examples, the inventor used two different preferred embodiments of the present invention. In the simplest embodiment of component (2) of the present invention, the sodium hexametaphosphate and sodium trimetaphosphate salts of phosphoric acid were used without the slow-release binder matrix to produce a preferred embodiment of the disclosed bioremediation nutrient composition. In the tests of preferred embodiments of the present invention intended to provide for the slow-release of the constituents in component (1), the embodiments of the slow-release geochemical-binder system tested included a combination of the sodium hexametaphosphate and sodium trimetaphosphate salts of phosphoric acid with an inorganic matrix comprised of both calcium carbonate and calcium phosphate. Both the simplified and slow-release embodiments of component (2) produced two different usable granular products, i.e., one quick-dispersing composition and one slow-release composition, using the same water-based high-shear granulation process disclosed herein. Hence, the combined advantages of the disclosed geochemical-binder system of component (2) and the simpler and safer high-shear granulation process of the present invention should allow for many different types of quick- and slow-release solid-chemical fertilizers and nutrient compositions to be economically prepared so as to meet the specific needs of different sectors of the agricultural/horticultural and phytoremediation/bioremediation markets.

The preferred means of producing the disclosed solid-chemical compositions of the present invention is via the disclosed high-shear granulation process of the present invention. Unlike the typical Tennessee Valley Authority (TVA) type high-shear granulation process, the improved process of the present invention replaces hazardous chemicals with water and the disclosed geochemical-binder system. According to the present invention, the use of anhydrous ammonia, which is extremely hazardous, and the use of the concentrated sulfuric and phosphoric acids, also hazardous chemicals, could be significantly reduced or eliminated from the "conventional" TVA-type high-shear granulation process currently used by the fertilizer industry to create an improved process which is simpler and safer to operate. For purposes of explanation and not limitation, no anhydrous ammonia, sulfuric acid or phosphoric acid were used in the successful manufacturing experiments conducted by the inventor (as described in the following examples). The use of the disclosed slow-release geochemical-binder system of component (2) permits the complete elimination of the use of sulfuric and phosphoric acids and anhydrous ammonia in the improved high-shear granulation process of the present invention. In each of these successful experiments, different embodiments of the nutrient component (1) and the slow-release geochemical binder system of component (2) were used to produce granular solid-chemical compositions containing large proportions of highly soluble nitrates. The bench-test manufacturing methods used by the inventor comprised a greatly simplified high-shear granulation process whereby relatively small amounts of water were used to create a slurry-blend of components (1) and (2). The slurries produced by the inventor were observed to become moderately exothermic upon the addition of water. Subsequently, the slurries were observed to be easily and quickly oven or air-dried to form solid granules or solid "bricks" which were then tested in water columns to verify the long-term stability and the slow-release of the soluble nitrates contained therein.

Based on the foregoing, the preferred means of manufacturing the solid-chemical compositions of the present invention would be to use a simpler and safer TVA-type high-shear granulation process as disclosed herein whereby the inorganic nitrogen supplied by the anhydrous ammonia would be replaced with nitrogen salts and the sulfuric and phosphoric acids would be largely or completely replaced with water in combination with the disclosed slow-release geochemical binding system of component (2). The moderate exothermic reaction(s) created by the addition of water to the mixture of components (1) and (2), together with heated air, would be used to dry the granular solid-chemical compositions in the rotating bin/tumbler. The improved TVA-type high-shear granulation process as disclosed herein would both simplify the manufacturing process and reduce the health and safety concerns of the manufacturing process via the reduction or elimination of the use of the dangerous anhydrous ammonia and concentrated sulfuric and phosphoric acids.

The chemical formulations and improved high-shear granulation process of the present invention can also be used to make slow-release composite forms such as fertilizer spikes used in the horticultural and home and garden industry. In experiments conducted by the inventor, the prototype slow-release nutrient compositions "NRC 2.1" and "NRC 3.1" (described in the following examples) were produced in pellets approximately 1.5-inch diameter×0.5-inch thick using plastic and paper molds to hold and shape the compositions as they dried. These compositions were first prepared as a slurry with water before placement in the molds.

Subsequent testing of the slow-release "pellets" confirmed their long-term stability for more than ten months in a water-column test (see FIG. 3). These results, and the ease with which they were achieved using simple embodiments of the present invention, illustrate the feasibility of the invention as a means for producing slow-release fertilizer "spikes" or similar molded forms of the disclosed slow-release solid-chemical compositions.

A specific advantage of the combination of the improved high-shear granulation process of the present invention with the use of components (1) and (2) of the slow-release solid-chemical compositions, as disclosed herein, is that the resultant granular slow-release solid-chemical compositions of the present invention provide sources of fertilizers and nutrients which disperse less quickly and are longer lived in the environment than the highly-soluble compounds typically found in most commercial fertilizers. The present invention may also help promote the more complete uptake of nutrients by plants in agricultural and horticultural applications and the growth and maintenance of a more diverse and robust community of beneficial microorganisms within contaminated-environmental media for bioremediation applications. Based on the knowledge and beliefs of the inventor, it is anticipated that the release-rate profiles of the soluble nutrients contained in component (1) of the disclosed solid-chemical compositions could be varied as a function of the relative proportions, by weight, of components (1) and (2), as well as by slight variations in the formulation of the geochemical-binder system of component (2).

There is currently a significant excess of the TVA-type high-shear granulation manufacturing capacity. For example, U.S. fertilizer industry executives estimate that only 40% or less of the domestically available TVA-type high-shear granulation manufacturing capacity is currently being utilized by the U.S. fertilizer industry. Accordingly, the combined advantages of the disclosed solid-chemical formulations and improved high-shear granulation process of the present invention should enable the present invention to be manufactured on an economy of scale which would allow the benefits of this slow-release fertilizer/nutrient technology to be provided in an economical manner to end-users for large-scale agricultural, horticulture and environmental remediation applications.

In the practice of the present invention, the ingredients which comprise the nutrient component (1) of the disclosed solid-chemical compositions would first be formulated to meet the specific needs of the end-user's application or process. For example, the formulations would be prepared to produce the desired N-P-K weight-percentage profiles for the specific end-use agricultural/horticultural or bioremediation/phytoremediation application or process. Next, the formulation of the slow-release geochemical binding system of component (2) as well as its weight proportion relative to component (1) would be adjusted according to the parameters specified herein to meet the desired release-rate profile for the end-user's application or process. Subsequently, the slow-release fertilizer or nutrient composition would be prepared by blending component (1) with component (2) with the addition of water in a rotating bin/tumbler according to the improved high-shear granulation process of the present invention. Finally, the granular solid-chemical product would be provided to the end user and applied using a mechanical spreader or similar device suited to the specific agricultural/horticultural or phytoremediation/bioremediation application or process. The combined advantages and end results of the present invention would be to provide the end user with a cost-effective, solid-chemical composition in an easy-to-use granular form which provides for a slow-release of the nutrient components to meet the specific needs and objectives of their agricultural/agribusiness or environmental-remediation application. The solid-chemical compositions and means for their preparation disclosed herein provide an improved and economical means of providing for the slow, sustained-release of a wide-variation of the "nutrient" ingredients of agricultural and horticultural fertilizers and phytoremediation and bioremediation nutrients.

For environmental remediation applications, the solid-chemical compositions prepared according to the present invention would be applied to and, ideally, mixed into the contaminated wastes (e.g., sludges, solid and/or liquid wastes, and the like) or other contaminated media such as soils, sediments, or water bodies, and the like. For applications involving the treatment of contaminated ground waters and aquifer media, the granulated solid-chemical compositions disclosed herein would be applied in filter socks, canisters, or cartridges within wells installed in the contaminated areas. Such applications of the disclosed solid-chemical compositions provide numerous advantages over bioremediation methods which involve the use of liquid-chemical compositions, including the reduction, if not elimination, of much of the equipment and labor required to operate and maintain an effective remediation program.

Another advantage of the use of the granulated solid-chemical compositions prepared in accordance with the present invention for environmental-remediation applications is that the final specific gravity of the granules can be "engineered" such that they rapidly sink in water. Hence, these forms of the disclosed solid-chemical compositions provide the means by which to apply the composition to the remediation of more complicated contamination problems, such as in the bioremediation of contaminated sediments in-situ beneath natural waters (e.g., oceans, lakes, rivers, streams, and the like) and man-made water bodies (e.g., waste-treatment lagoons and the like) and the remediation of dense non-aqueous phase liquids (DNAPLs) and/or depth-specific stratigraphic layers present in subsurface hydrogeologic environments. For example, if it can be determined that high levels of contaminants are trapped in specific strata or at specific depths, such as is often the case with DNAPL solvents such as TCE and PCE, the rapid-sinking nature of the granulated compositions provides a means for targeting the treatment of such contamination. In addition, for applications involving the in-situ bioremediation of contaminated bedrock aquifers, these forms can be poured directly into "open rock" wells or boreholes in the rock, providing for a simple and inexpensive means of conducting repeated applications of the disclosed compositions.

EXAMPLES

The following examples are provided to illustrate the technical basis, merits and unique advantages provided by the present invention. These examples are not to be construed as limiting the present invention in any way, but are merely presented as examples of the unique advantages and non-obvious improvements of the present invention over the prior art and to illustrate the practice of the present invention as described in the appended claims.

Example 1

Bench-scale experiments were conducted to evaluate the feasibility of using a simplified, water-based high-shear granulation process to produce slow-release solid-chemical nutrient compositions. The bench-test manufacturing methods used by the inventor comprised a greatly simplified high-shear granulation process whereby small amounts of water were used to create a slurry-blend of components (1) and (2). The slurries produced by the inventor were observed to become moderately exothermic upon the addition of water, as evidenced by a slight-to-moderate increase in the temperature of the slurries relative to ambient temperatures. Subsequently, the slurries were observed to be easily and quickly oven or air-dried to form solid granules or solid "bricks" which were then tested in water columns to verify the long-term stability and slow-release of the soluble nitrates contained therein.

Several prototype compositions were produced using the simplified, bench-scale high-shear granulation process described above. The simplest and earliest successful prototype composition produced according to the disclosed process, designated as composition "NRC 2.1," included, by dry weight, 25.0% sodium nitrate comprising component (1); 0.5% sodium trimetaphosphate, 4.5% sodium hexametaphosphate, 67.0% calcium carbonate, 1.0% citric acid and 2.0% powdered molasses comprising a simplified embodiment of the slow-release geochemical binder system of component (2). A more successful variant of the "NRC 2.1" composition was produced via the elimination of the powdered molasses in component (2).

A more successful early prototype produced using the modified high-shear granulation process disclosed herein, designated as composition "NRC 3.1," included, by dry weight, 17.5% sodium nitrate comprising component (1) and 0.5% sodium trimetaphosphate, 2.5% sodium hexametaphosphate, 69.0% calcium carbonate 7.5% calcium phosphate, 1.0% citric acid and 2.0% powdered molasses comprising the slow-release geochemical binder system of component (2). As described above for the "NRC 2.1" experiments, a more successful variant of the "NRC 3.1" composition was produced by eliminating the powdered molasses from component (2).

In general, the "granules" of these different embodiments produced using this method held up underwater-saturated conditions for several months. For example, the granules of the "NRC 3.1" prototype composition (without powdered molasses) have maintained integrity in a water-column test for approximately 11 months.

These early experiments helped to distinguish the aforementioned high-shear granulation process as disclosed herein as the preferred method of preparing the solid-chemical compositions of the present invention. Moreover, given the extremely high solubility of sodium nitrate and the difficulty in "controlling" the release rate of such a highly soluble compound, these experiments provided evidence that the combined advantages of the disclosed solid-chemical formulations and high-shear granulation process of the present invention could be used to provide for the slow-release of the highly soluble sodium nitrate.

Example 2

The inventor conducted a set of experiments concerning the prototype slow-release nutrient compositions "NRC 2.1" and "NRC 3.1"(described in the following examples) were produced in pellets approximately 1.5-inch diameter×0.5-inch thick using plastic and paper molds to hold and shape the compositions as they dried. These compositions were first prepared as a slurry with water before placement in the molds according to the improved, water-based high-shear granulation process of the present invention. Subsequent testing of the slow-release "pellets" confirmed their long-term stability for more than ten months in a water-column test (see FIG. 3). These results, and the ease with which they were achieved using simple embodiments of the disclosed solid-chemical compositions, illustrate the feasibility of using the present invention as a means for producing slow-release fertilizer "spikes" or similar molded forms of the disclosed slow-release solid-chemical compositions.

Example 3

The inventor conducted a set of experiments designed to evaluate and compare the feasibility of using a compaction-type granulation process to produce bioremediation-application embodiments of the disclosed solid-chemical compositions of the present invention relative to the high-shear granulation process disclosed herein. The bioremediation compositions tested were designed to provide the rapid-release benefits typically associated with liquid fertilizers in a solid-chemical form; i.e., slow-release of the inorganic nutrients was not an objective of these tests.

The compaction-type granulation tests utilized a Fitzpatrick Model IR 520 Chilsonator System, including a Model M5A granulator. The Model IR 520 Fitzpatrick Chilsonator system is a small-scale version of larger Fitzpatrick briquetting and granulation systems, and is typically used for small-scale production runs and prototype tests, the results of which can be scaled to larger Fitzpatrick Chilsonator systems.

A prototype bioremediation composition designated as "SNB 1.1" was tested using the Fitzpatrick Model IR 520 Chilsonator System, including a Model M5A granulator. The prototype composition "SNB 1.1" comprised, by dry weight, 84% sodium nitrate as the source of inorganic nitrogen, 2.5% sodium trimetaphosphate and 11.0% sodium hexametaphosphate as the source of inorganic phosphorus, 0.5% citric acid as a chelating agent, 1.0% sodium bentonite as a binder, and 1.0% talc as a lubricant/glidant for the compaction-type granulation process. The compaction-type granulation experiments with the prototype "SNB 1.1" composition and slight variations thereof failed to produce a usable "product," let alone a form of the solid-chemical composition which would hold up under water-saturated conditions.

A second prototype bioremediation composition, designated as "SNB 1.2," was test-produced according to the bench-scale high-shear granulation process disclosed herein. Prototype composition "SNB 1.2" comprised, by dry weight, 92.5% sodium nitrate as the source of inorganic nitrogen, and 2.5% sodium trimetaphosphate and 5.0% sodium hexametaphosphate as both the binding agents and sources of inorganic phosphorus. The bench-scale high-shear granulation process produced a usable granulated embodiment of the prototype "SNB 1.2" composition.

While the compaction-type granulation experiments failed to produce a viable "product," they did confirm the previously identified advantages of the improved high-shear granulation process disclosed herein. Moreover, by comparison, the experiments with prototype composition "SNB 1.2" verified that the simplified high-shear granulation process can produce simplified embodiments of the disclosed solid-chemical compositions for bioremediation applications.

Example 4

Additional bench-scale experiments were conducted to evaluate the feasibility of using the simplified high-shear granulation process described in Example 1 to produce additional slow-release solid-chemical nutrient compositions based on variations of the proportions and formulations of the components used in the prototype variant of the "NRC 3.1" composition without the powdered molasses as described above.

A highly successful prototype, designated as composition "NRC 13.3.2," included, by dry weight, 62.0% sodium nitrate comprising component (1); and 2.5% sodium trimetaphosphate, 5.0% sodium hexametaphosphate, 26.0% calcium carbonate and 4.5% calcium phosphate comprising the slow-release geochemical binder system of component (2).

The "NRC 13.3.2" series granulated composition was also observed to exhibit long-term stability in water-column tests.

Another highly successful prototype produced by the inventor, designated as composition "NRC 13.4.1," included, by dry weight, 78.0% sodium nitrate comprising component (1), and 2.5% sodium trimetaphosphate, 5.0% sodium hexametaphosphate, 10.0% calcium carbonate and 4.5% calcium phosphate comprising the slow-release geochemical binder system of component (2). The "NRC 13.4.1" composition was also observed to exhibit long-term stability in water-column tests.

Another highly successful prototype containing an even higher proportion of the highly soluble sodium nitrate compound, designated as composition "NRC 13.5.1," was produced which included, by dry weight, 84.0% sodium nitrate comprising component (1); and 2.5% sodium trimetaphosphate, 5.0% sodium hexametaphosphate, 5.0% calcium carbonate and 3.5% calcium phosphate comprising the slow-release geochemical binder system of component (2).

Each of these "NRC 13 series" prototype compositions were highly successful in that they each demonstrated the efficacy and capability of the slow-release geochemical binder system of component (2) and the improved high-shear granulation process to produce slow-release compositions containing high proportions of the highly soluble sodium nitrate compound. In the past, persons skilled in the art had previously been unable to produce inexpensive slow-release fertilizer compositions that contain sodium nitrate, or "soda" as it is referred to in the fertilizer industry, because of its high solubility.

Aside from the significant increase in the soluble component (1), the primary differences between the early experiments of the "NRC 2.1" and "NRC 3.1" compositions and the more recent "NRC 13" series compositions was the removal of both the powdered molasses and the citric acid from component (2). Prior to the completion of the earlier experiments described in Example 1, the powdered molasses and citric acid were thought to be able to help bind the compositions. However, based on the results of the experiments described in Example 1 and in Example 2, the inventor determined that these materials were not necessary, and in fact, that they reduced the effectiveness of the geochemical binder system of component (2).

The combined results of the experiments described in Examples 1 and 3 led the inventor to identify and confirm that the preferred geochemical binder system for component (2) comprises a combination of a low solubility carbonate such as calcium carbonate and a low-solubility phosphate such as calcium phosphate together with salts of phosphoric acid. Furthermore, the combined results of the experiments described in Examples 1, 2 and 3 confirmed that the disclosed high-shear granulation process is the preferred method of preparing the slow-release solid-chemical compositions of the present invention.

I claim:

1. An ammonium- and urea-free solid-chemical composition for the anaerobic bioremediation of chemical contaminants in the environment coupled to the biological process of denitrification, comprising:

a. a soluble source of inorganic nitrate salts comprising up to about 99.5% by weight of the composition, being one or more selected from the group consisting of sodium nitrate, potassium nitrate, sodium-potassium nitrate and calcium nitrate; and b. a binder and source of inorganic nutrient phosphorus comprising salts of phosphoric acid from about 0.5% to 13% by weight of the composition.

2. The solid-chemical composition of claim 1, whereby said salts of phosphoric acid are selected from one or more of the group consisting of sodium hexametaphosphate, sodium trimetaphosphate, potassium hexametaphosphate, and potassium tetrametaphosphate.

3. The solid-chemical composition of claim 1, further comprising a source of micronutrients selected from one or more of the group of elements consisting of potassium, sulfur, calcium, magnesium, boron, copper, iron, manganese, molybdenum and zinc.

4. The solid-chemical composition of claim 1, further comprising a source of micronutrients, said micronutrients being one or more selected from the group consisting of calcium sulfate, calcium chloride, calcitic lime, dolomite, magnesium sulfate, potassium sulfate, potassium-magnesium sulfate, borax, boric acid, sodium pentaborate, sodium tetraborate, cupric chloride, copper sulfate, ferrous sulfate, manganese sulfate, sodium molybdate, zinc oxide and zinc sulfate.

5. The solid-chemical composition of claim 1, further comprising a chelating agent.

6. The solid-chemical composition of claim 1, further comprising a chelating agent from about 0.01% to 3% by weight of the composition, whereby said chelating agent is one or more selected from the group consisting of citric acid, sodium citrate, potassium citrate, humic acid, fulvic acid, nitrilotriacetic acid (NTA), and ethylenediaminetetraacetic acid (EDTA).

7. The solid-chemical composition of claim 1, further comprising a disintegrant.

8. The solid-chemical composition of claim 1, further comprising a disintegrant from about 0.05% to 5% by weight of the composition, being one or more selected from the group consisting of sodium bicarbonate and sodium bentonite.

9. The solid-chemical composition of claims 1, 2, 3, 4, 5, 6, 7, 8 prepared in the forms of granules, briquettes, pellets, tablets, spikes, or other formed shapes.

10. The solid-chemical composition of claims 1, 2, 3, 4, 5, 6, 7, 8 produced in a granular form by the method of high-shear granulation without the use of anhydrous ammonia and one or more chemicals selected from the group consisting of sulfuric acid and phosphoric acid.

* * * * *